(12) United States Patent  (10) Patent No.: US 12,047,361 B2
Wiegel  (45) Date of Patent: Jul. 23, 2024

(54) SECURE COMMUNICATION OF PAYLOAD DATA

(71) Applicant: Zertificon Solutions GmbH, Berlin (DE)

(72) Inventor: Burkhard Wiegel, Berlin (DE)

(73) Assignee: ZERTIFICON SOLUTIONS GMBH, Berlin (DE)

( * ) Notice: Subject to any disclaimer, the term of this patent is extended or adjusted under 35 U.S.C. 154(b) by 509 days.

(21) Appl. No.: 17/240,254

(22) Filed: Apr. 26, 2021

(65) Prior Publication Data
US 2021/0258287 A1 Aug. 19, 2021

Related U.S. Application Data

(63) Continuation of application No. PCT/EP2019/079294, filed on Oct. 25, 2019.

(30) Foreign Application Priority Data

Oct. 27, 2018 (EP) .................................. 18203006

(51) Int. Cl.
H04L 9/40 (2022.01)
H04L 9/08 (2006.01)
(52) U.S. Cl.
CPC .......... H04L 63/045 (2013.01); H04L 9/0827 (2013.01); H04L 9/0894 (2013.01); H04L 63/0471 (2013.01)
(58) Field of Classification Search
USPC ....................................................... 713/153
See application file for complete search history.

(56) References Cited

U.S. PATENT DOCUMENTS 6,377,688 B1   4/2002  Numao
7,263,619 B1   8/2007  Kim
(Continued)

FOREIGN PATENT DOCUMENTS

EP  0869652 A2   10/1998
EP  1133849 B1 *  6/2002  ......... H04N 21/2347
(Continued)

OTHER PUBLICATIONS

International Searching Authority, "Search Report" in application No. PCT/EP2019/079294, dated Dec. 3, 2019, 16 pages.
(Continued)

Primary Examiner — Sakinah White Taylor
(74) Attorney, Agent, or Firm — Hickman Becker Bingham Ledesma LLP

(57) ABSTRACT

Secure communication of payload data is provided from a server system to a destination system used by a recipient. The recipient is associated with a key pair including a public key and a private key, the private key being protected by a password or passphrase of the recipient. The server system generates and sends a conveyance message to the destination system. The conveyance message contains at least the payload data encrypted using a payload key. After receipt of the conveyance message, the destination system prompts the recipient for his or her password or passphrase. The server system uses the recipient's password or passphrase to access the recipient's private key, and then uses the private key to decrypt the encrypted version of the payload key. The server system sends the payload key to the destination system, and the destination system in turn uses the payload key to decrypt the payload data.

21 Claims, 2 Drawing Sheets

(56) References Cited

U.S. PATENT DOCUMENTS

| | | | |
|---|---|---|---|
| 8,145,718 B1* | 3/2012 | Kacker | H04L 63/126 |
| | | | 713/153 |
| 8,171,563 B2 | 5/2012 | Pauker | |
| 8,769,260 B1 | 7/2014 | Kwan | |
| 2001/0014158 A1 | 8/2001 | Baltzley | |
| 2005/0027989 A1* | 2/2005 | Sandhu | H04L 63/083 |
| | | | 713/182 |
| 2005/0071632 A1 | 3/2005 | Pauker | |
| 2005/0160292 A1* | 7/2005 | Batthish | H04L 9/3249 |
| | | | 726/5 |
| 2008/0123850 A1 | 5/2008 | Bhatnagar | |
| 2013/0198513 A1 | 8/2013 | Kim | |
| 2014/0140508 A1* | 5/2014 | Kamath | H04L 9/0822 |
| | | | 380/255 |
| 2018/0107834 A1* | 4/2018 | Erofeev | G06F 21/602 |

FOREIGN PATENT DOCUMENTS

| | | |
|---|---|---|
| EP | 1478143 B1 | 10/2005 |
| WO | WO 02/076171 A2 | 9/2002 |
| WO | WO 03/017559 A2 | 2/2003 |
| WO | WO 2005/015862 A1 | 2/2005 |

OTHER PUBLICATIONS

Feng Bao, "Introducing decryption authority into PKI", Proceedings 16th Annual Computer Security Applications Conference (ACSAC '00), IEEE Conf. publication, Dec. 11, 2000, 9pgs.

European Patent Office, "Extended Search Report" in application No. 18203006.4, dated Feb. 21, 2019, 13 pages.

\* cited by examiner

SECURE COMMUNICATION OF PAYLOAD DATA

PRIORITY CLAIM

This application claims the benefit, under 35 U.S.C. § 120, as a Continuation of PCT Application No. PCT/EP2019/079294, filed Oct. 25, 2019, which claims the benefit of EP Application No. 18203006.4, filed Oct. 27, 2018. The applicant(s) hereby rescind any disclaimer of claim scope in the parent applications or the prosecution history thereof and advise the USPTO that the claims in this application may be broader than any claim in the parent applications.

FIELD OF THE INVENTION

The present invention relates to the field of data communications, and in particular to the field of secure communication of payload data from a server system to a destination system.

BACKGROUND OF THE INVENTION

The ubiquitous use of electronic data communications has given rise to increased security concerns. Secure encryption methods have been known since decades, but they are not yet in general use. In particular, it is difficult to strike a suitable balance between security, ease of use, and the wide adoption of a particular cryptographic technique.

EP 1 478 143 B1 discloses a technique for secure transmission of electronic messages. A sender apparatus encrypts a first electronic message, adds the encrypted first electronic message to content of a second electronic message in the format of a text markup language, and transmits the second electronic message to a receiver apparatus. The receiver apparatus transmits the encrypted first electronic message back to the sender apparatus. The sender apparatus decrypts the first electronic message and transmits it back to the receiver apparatus via a secured connection for displaying the decrypted first electronic message by the receiver apparatus.

The technique disclosed in EP 1 478 143 B1 provides high usability and a high level of security. However, there is the difficulty that the first electronic message is transferred between the sender apparatus and the receiver apparatus a total of three times. Especially for large messages or other large volumes of data, this requires a relatively large communication bandwidth, which may be particularly problematic if, for example, the receiving apparatus is a mobile device.

US 2008/0123850 A1 discloses methods, systems, and computer readable media for secure messaging. One method includes generating a first key associated with a sender, encrypting a message from the sender to a recipient using the first key, encrypting the first key with a second key, storing the encrypted message and the encrypted first key at a message server, associating the encrypted message with the sender and the recipient, decrypting the encrypted first key using a key related to the second key, and decrypting the encrypted message using the first key.

SUMMARY OF THE INVENTION

It is an object of the present invention to provide a technique for secure communication of payload data that combines high levels of security and usability with high efficiency.

The present invention is defined by the independent claims. The dependent claims concern optional features of some embodiments of the invention. Due account shall be taken of any element which is equivalent to an element specified in the claims Aspects of the present disclosure involve the transmission of a conveyance message from a server system to a destination system, and the transmission of a return message from the destination system to the server system. In the course of these operations, the payload data is only sent once between the server system and the destination system, namely in encrypted form in the conveyance message. The return message preferably does not comprise the payload data (nor an encrypted version thereof), but rather a password or passphrase of the recipient. According to some aspects of the present disclosure, the return message further comprises an encrypted version of the payload key that was originally used to encrypt the payload data. According to other aspects of the present disclosure, the encrypted version of the payload key is not included in the return message, but is rather stored by the server system in persistent storage. After receipt of the return message, the server system uses the recipient's password or passphrase to access the recipient's private key, uses the recipient's private key to decrypt the encrypted version of the payload key, and then sends the decrypted payload key to the destination system using a secured communication channel. The destination system in turn uses the payload key to decrypt the payload data.

The technique according to the present disclosure avoids repeated transmissions of the payload data between the server system and the destination system and thus conserves communication bandwidth. Furthermore, the technique according to the present disclosure provides particularly high security against eavesdropping even if the secured communication channel is compromised, as the payload data is never transferred in plaintext via the secured communication channel.

The order in which the operations and method steps are recited in the claims should not be construed as limiting. It is apparent that many of these operations and method steps can be performed in a different order or wholly or partially parallel or wholly or partially interleaved with each other.

The machine-readable medium according to the present disclosure may comprise suitable program instructions to realize the recited operations, for example on a general-purpose computer, or on a device comprising a processor (for example, a mobile device such as a smartphone or tablet), or in a programmable integrated circuit. The machine-readable medium may be any kind of physical or non-physical data carrier like, for example, a computer disk, or a CD-ROM, or a semiconductor memory, or a signal transmitted over a computer network.

BRIEF DESCRIPTION OF THE DRAWINGS

Further features, objects and advantages of the invention will become apparent from the following detailed description, in connection with the annexed schematic drawings, in which.

DETAILED DESCRIPTION

The presently described embodiments make use of a server system 10 and a destination system 12. Each of the server system 10 and the destination system 12 may be implemented by or using a commonly known physical or virtual computer, such as a server, a desktop computer, a notebook, a smartphone or other kind of mobile device, a virtual machine executed on any of the before-mentioned kinds of hardware, a virtual machine running in a cloud system, and so on. The server system 10 may also be implemented by or using two or more networked physical or virtual computers. The server system 10 and the destination system 12 communicate with each other via any known communication means, such as over the Internet.

Figure 1:
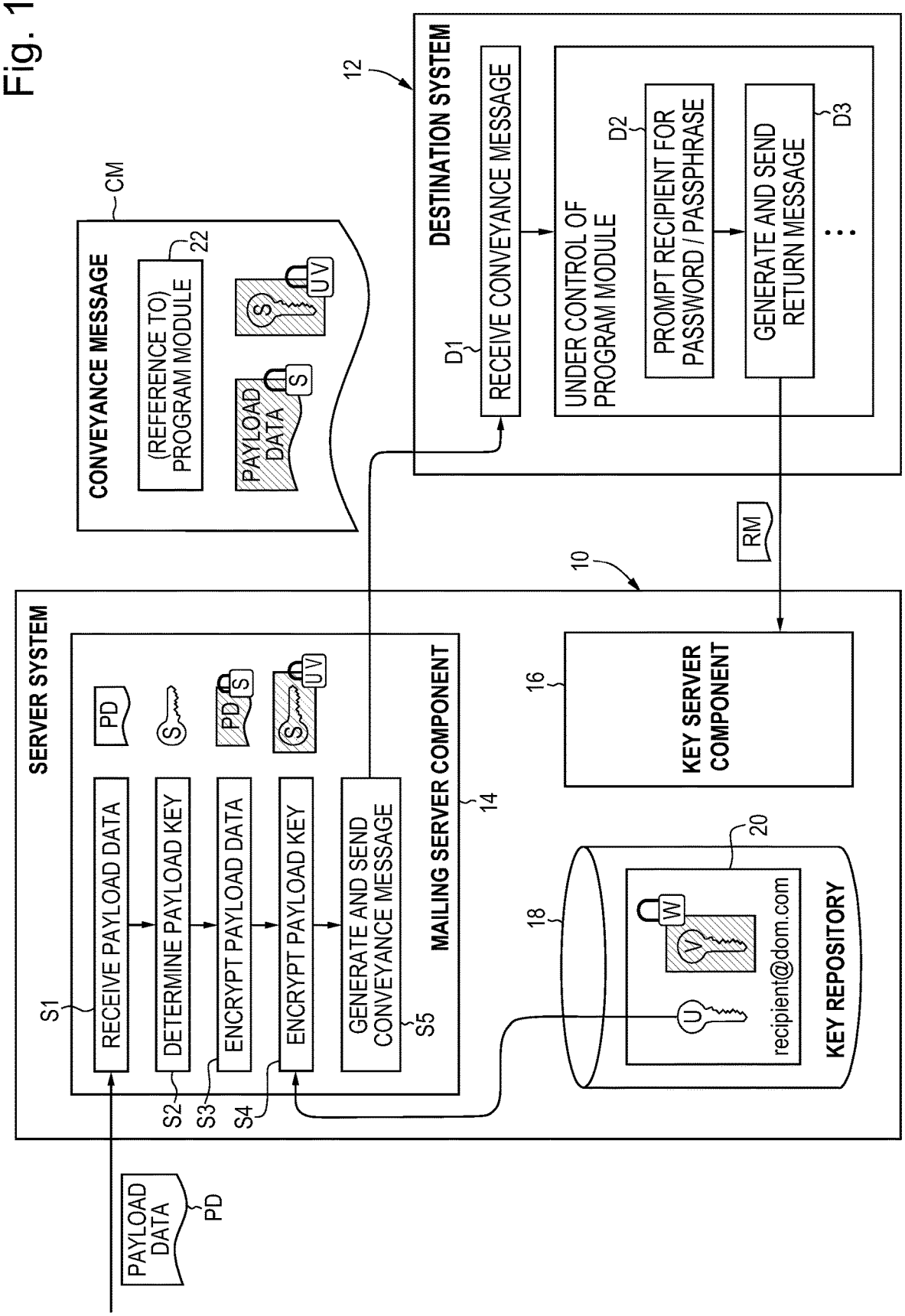
FIG. 1 and FIG. 2 each show components of a server system and a destination system according to a sample embodiment of the present disclosure, as well as data structures used and operations performed during execution of a secure communication method according to this sample embodiment.
Figure 2:
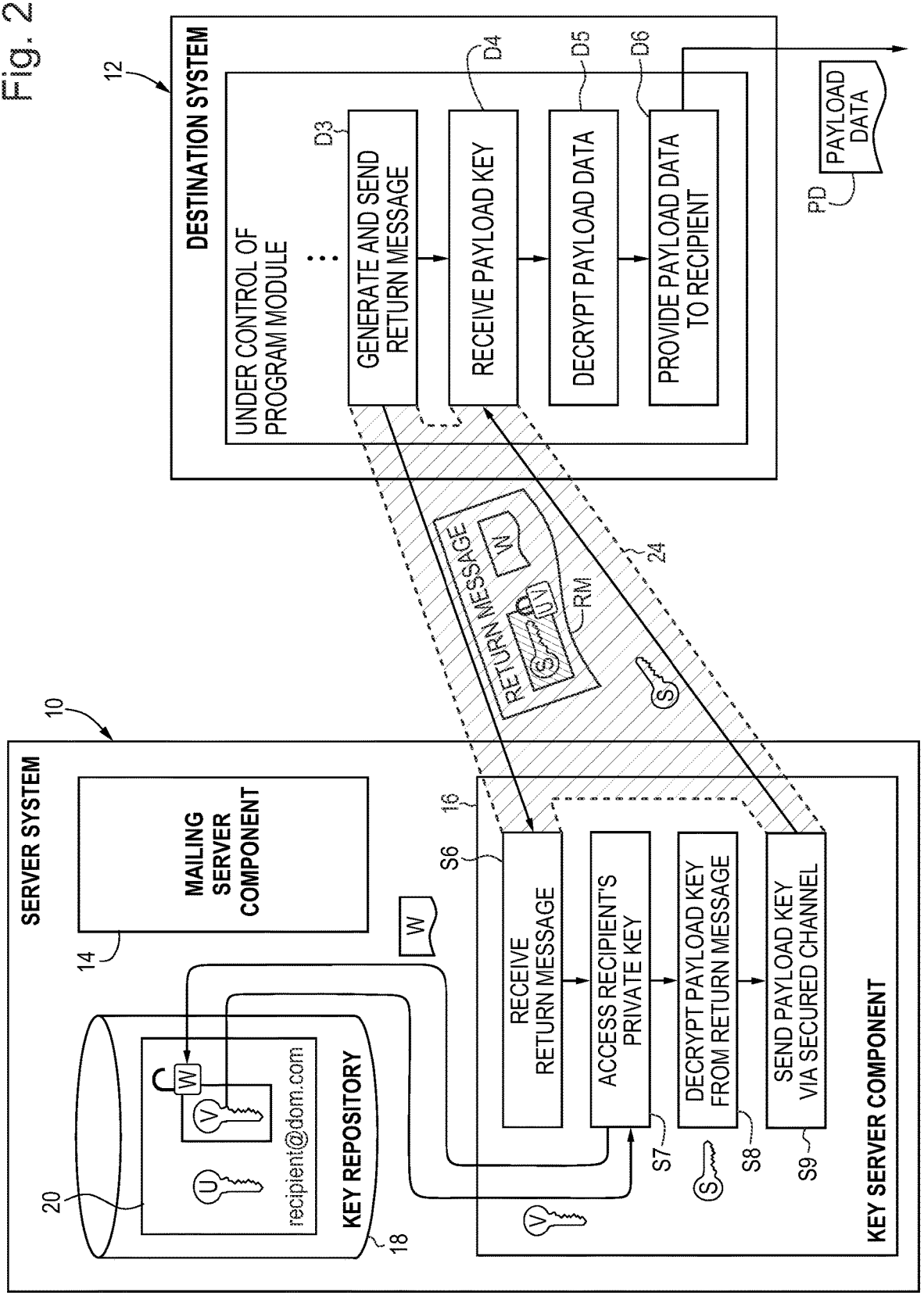

FIG. 1 and FIG. 2 show some of the components of the server system 10, namely a mailing server component 14, a key server component 16, and a key repository 18. These components may be implemented in the form of software modules of a single program, or as a plurality of interacting programs executed on a single machine, or as a plurality of interacting programs executed on distinct physical or virtual machines.

The presently described embodiments provide a means for secure communication of payload data PD from the server system 10 to the destination system 12. The destination system 12 is used by, or otherwise associated with, a recipient, for example a human being to whom the payload data PD should be communicated. The recipient may be identified by any means of identification, such as by his or her email address ("recipient@dom.com") in the example shown in FIG. 1 and FIG. 2.

The key repository 18 of the server system 10 maintains a key pair 20 that is associated with the recipient. In the example shown in FIG. 1 and FIG. 2, the association is via the recipient's email address, i.e., "recipient@dom.com". It is apparent that other means of association may be used in other embodiments. In many embodiments the key repository 18 stores a multitude of key pairs for a multitude of different recipients.

The key pair 20 comprises a public key U and a private key V for use in an asymmetric encryption/decryption method. Suitable methods, such as the RSA method or the ElGamal method or other methods, are well known. The private key V is further protected by a password or passphrase W. For example, the private key V may be stored in the key repository 18 in encrypted form, with the password or passphrase W used as a key that allows the private key V to be decrypted. As another example, the private key V may be stored in a secure storage of the key repository 18, and the key repository 18 may only allow access to the private key V to an entity that provides the password or passphrase W. This second approach is feasible since the key repository 18 is a trusted entity. The server system 10 generally does not store passwords or passphrases of a user—including, but not limited to, the recipient's password or passphrase W—in plaintext. Instead, only (salted) hashes of such passwords or passphrases are stored. When a user enters a password or passphrase, the entered data is hashed and compared to the stored hash. This precautionary measure should be used if the key repository 18 maintains a list of recipients' passwords or passphrases W. It can also be used, but does not necessarily need to be used, in the above-mentioned embodiments in which the password or passphrase W is not durably stored in the server system 10, but serves as a key that allows the private key V to be decrypted: the key would then be the hashed password or passphrase W.

In some embodiments, the key repository 18 and/or the encryption of the private key V in the key repository 18 is/are configured such that the private key V can not only be obtained using the password or passphrase W, but also using one or more other keys. For example, there may be a system function that allows a trusted administrator to access the private key V of the recipient using a special escrow key instead of the password or passphrase W. As another example, a further key allowing access to the private key W may be generated from the recipient's response to one or more security questions. This allows the recipient to decrypt the payload data PD even in case the recipient forgets his or her password or passphrase W.

The process according to the presently described sample embodiment begins with step S1 shown in FIG. 1, in which the mailing server component 14 of the server system 10 receives the payload data DP which is to be securely communicated to the recipient. For example, the payload data DP may be an email directed to the recipient as identified by his or her email address. The email may contain text only, or it may be a multi-part email according to the MIME standard, comprising different types of content. However, the present invention is not limited to the transmission of emails: all kinds of data and all kinds of messages may be used as the payload data PD. This includes, as further examples, SMS and chat messages, which may also indicate the recipient's address in other ways as by an email addresses. The server system 10 may receive the payload data DP from a sender via any communication means, such as via an internal (trusted) network, or via a secured communication channel (e.g., a VPN tunnel or SSL tunnel), or as encrypted payload data DP that is decrypted at the server system 10.

In the subsequent steps S2, S3 and S4, the mailing server component 14 of the server system 10 generates an encrypted version of the payload data PD using a hybrid encryption method. Hybrid encryption methods are known as such in connection with asymmetric encryption. Briefly summarized, the hybrid encryption in the presently described sample embodiment comprises a symmetric encryption of the payload data PD using a payload key S, and an asymmetric encryption of the payload key S using a public key U of the recipient.

More in detail, a payload key S is generated in step S2. An attacker must not be able to determine the payload key S. This is generally achieved by generating random data which forms either the complete payload key S or at least part thereof. Presently a payload key S with at least 128 bit of random data is considered reasonably secure, but longer payload keys S may be used as a matter of precaution. In the presently described embodiment, an individual payload key S is generated for each execution of the described method.

Step S3 concerns the encryption of the payload data PD using the payload key S, by means of a symmetric encryption method. Suitable symmetric encryption methods are known as such and include, for example and without limitation, DES, Triple-DES, AES, and so on. The resulting encrypted version of the payload data PD is shown in FIG. 1 by a hatched symbol for the payload data PD and a lock with the payload key S, which is used for both encryption and decryption. In the presently described embodiment, the encrypted version of the payload data PD and the encrypted version of the payload key S may be combined into an PKCS #7 object or an S/MIME object or any other security container format such as a format according to the PGP de-facto standard or a format according to any other standard or de-facto standard.

The payload key S is encrypted in step S4 using the public key U of the recipient. A suitable asymmetric encryption method is used, such as any of the methods indicated above in the description of the key pair 20. The result of step S4 is an encrypted version of the payload key S, which has been encrypted using the public key U and can be decrypted using the private key V. This encrypted version is depicted in FIG. 1 and FIG. 2 by a hatched box including the payload key S, with a lock that shows the public key U used for encryption and the private key V used for decryption. In some embodiments, a further escrow key allowing decryption of the payload key S may be provided, in order to allow trusted administrators access to the payload key S and thus to the payload data PD.

It is apparent that steps S3 and S4 are independent from each other. These steps can therefore be performed in any order, or in parallel with each other, or in an interleaved fashion. The same applies with respect to steps S1 and S2. The present disclosure is intended to comprise all orders and permutations of the described steps, as long as these orders are feasible from a technical point of view.

In a further operation, which is shown in FIG. 1 as step S5, the mailing server component 14 of the server system 10 generates a conveyance message CM, and sends the conveyance message CM to the destination system 12. In the presently described embodiment, the conveyance message CM is an email message directed to the email address of the recipient. However, it is apparent that any other message format and communication technique can be used to transfer the conveyance message CM to the destination system 12. This includes, as non-limiting examples, SMS and chat messages, especially in cases in which the server system 10 also received the payload data PD in the form of an SMS or chat message.

The conveyance message CM in the presently described embodiment comprises an email body that essentially consists of an HTML section which serves as a container for (i) the encrypted version of the payload data PD, (ii) the encrypted version of the payload key S, and (iii) a program module 22. For example, the above-mentioned elements can be included as elements of an HTML form or an HTML table, or they can be delimited within the HTML section by any suitable tag, such as <div> or <meta> or a non-standardized tag. As mentioned above, in some (but not all) embodiments the encrypted version of the payload data PD and the encrypted version of the payload key S are further wrapped into an S/MIME container or a container according to another format, such as one of the above-mentioned formats. It is apparent that markup languages different from HTML can be used in other embodiments for composing the conveyance message CM.

The program module 22 controls some, most, or all of the operations by which the destination system 12 processes the conveyance message CM, in a manner which will be described below. In some embodiments the entire program module 22 is contained in the conveyance message CM, so that the operations performed by the destination system 12 will essentially be determined at the time the conveyance message CM is generated and sent (step S5). However, in other embodiments only part of the program module 22 is included in the conveyance message CM. This part comprises at least one reference to an external server (for example, but not limited to, the server system 10), from which the destination system 12 obtains at least one further part of the program module 22 when processing the conveyance message CM. These embodiments have the advantage that program updates can be provided even after the conveyance message CM has been communicated to the destination system 12. Taking this idea to the extreme, embodiments are envisaged in which the conveyance message CM only comprises one reference or a few references to externally stored code, and essentially the entire program module 22 is downloaded to the destination system 12 when the destination system 12 processes the conveyance message CM.

The processing operations at the destination system 12 start in step D1 with receipt of the conveyance message CM. In embodiments in which the conveyance message CM is an email comprising a markup language section such as an HTML container, the email may be processed at the destination system 12 by any email client application which is capable of interpreting the markup language section. This includes commonly used email client applications such as those known under the trademarks for the Microsoft® Outlook® email client, the IBM® Notes® email client, and the Mozilla® Thunderbird® email client, as well as mobile-based email clients and browser-based email clients executed within an Internet browser such as the ones known under the trademarks for the Microsoft® Edge® Web browser, the Mozilla Firefox® Web browser, the Apple® Safari® Web browser, or the Google Chrome® Web browser. In some embodiments, the conveyance message CM may also be processed by a dedicated application running at the destination system 12. These embodiments may or may not use conveyance messages CM that comprise a program module 22.

In the embodiment shown in FIG. 1 and FIG. 2, the operations subsequent to receipt of the conveyance message CM at the destination system 12 are performed under control of the program module 22, no matter whether this program module 22 is fully or partly contained in the conveyance message CM, or is fully or partly downloaded from an external server. For example and without limitation, the program module 22 may comprise at least one script language component (such as a JavaScript or ECMAScript component) and/or at least one style sheet (such as a CSS style sheet) and/or at least one template. Alternatively or additionally, the program module 22 may also comprise code in languages that are generally not considered as scripting languages, such as JAVA™ bytecode or any other partly or fully compiled code.

In a first operation performed under control of the program module 22 (step D2), the destination system 12 prompts the recipient for the password or passphrase W associated with the recipient's private key V. In some embodiments, step D2 is simply implemented as an HTML <input> element within an HTML form contained in the conveyance message CM.

Step D3, which is shown both in FIG. 1 and FIG. 2, concerns the generation of a return message RM by the destination system 12. As depicted in FIG. 2, the return message RM comprises the recipient's password or passphrase W entered in step D2, as well as the encrypted version of the payload key S, which the destination system 12 received in the conveyance message CM. In the presently described embodiment, the server system 10 does not store the payload key S, nor the encrypted version thereof. This has the advantage of reducing the storage requirements at the server system 10, and it also facilitates implementations in which the key server component 16 is separate from the mailing server component 14. However, embodiments are also envisaged in which the key server component 16 has, at least in some cases, direct access to the payload key S or the encrypted version thereof. In these embodiments, the return message RM does not necessarily need to comprise the encrypted version of the payload key S.

The return message RM is sent from the destination system 12 to the server system 10 via a secured communication channel 24 such as an SSL or TSL channel established between the key server component 16 of the server system 10 and the destination system 12. This is especially important in embodiments in which the return message RM contains the recipient's password or passphrase W in plaintext. In other embodiments, the secured communication channel 24 is implemented by sending the return message RM openly, but including the password or passphrase W in the return message RM not as plaintext, but in encrypted form. This encrypted form may be, for example and without limitation, a version of the password or passphrase W that is encrypted with a public key of the server system 10, using an asymmetric encryption method.

The key server component 16 of the server system 10 receives the return message RM in step S6. In the subsequent step S7, the key server component 16 uses the recipient's password or passphrase W, which was contained in the return message RM, to access the recipient's private key V in the key repository 18. For this purpose, the key server component 16 communicates the recipient's identity (such as his or her email address) and the recipient's password or passphrase W to the key repository 18. Depending on how the private key V is protected within the key repository 18, the key repository 18 may either verify the password or passphrase W to unlock the private key V, or use the password or passphrase W to decrypt the private key V. The key repository 18 then communicates the recipient's private key V to the key server component 16, using a suitably secured communication channel. Importantly, the recipient's private key V never leaves the trusted environment of the server system 10. In the presently described embodiment, the server system 10 does not store the received password or passphrase W any longer than needed to access the recipient's private key V from the key repository 18.

In step S8, the key server component 16 uses the recipient's private key V received from the key repository 18 to decrypt the encrypted version of the payload key S from the return message RM. This is done using the above-mentioned asymmetric encryption/decryption method, which was employed in step S4 to encrypt the payload key S. The decrypted payload key S is then sent to the destination system 12 in step S9. In order to prevent the decrypted payload key S from being spied out, this communication also takes place via the previously established secured communication channel 24. In alternative embodiments, a new secure communication channel may be established between the server system 10 and the destination system 12 for transmitting the return message RM.

The destination system 12 receives the decrypted (i.e., plaintext) payload key S in step D4. In the subsequent step D5, the destination system 12 uses the payload key S to decrypt the encrypted version of the payload data PD. Again, this step D5 is performed under control of the program module 22, which provides an implementation of the same symmetric encryption/decryption method that was used by the server system 10 in step S3. As a non-limiting example, the program module 22 may provide a JavaScript implementation of AES, and the payload key S may be an AES key used to decrypt the payload data PD. The decrypted payload data PD is provided to the recipient in a final step D6. For example, if the payload data PD is a message, it may be shown to the recipient in a window of the email client or browser which executes steps D2-D5 described above.

Alternatively or additionally, the recipient may be prompted to save the payload data PD in a suitable repository or file system.

In some embodiments, the secured communication channel 24 is closed and the access of the key server component 16 to the recipient's private key V is ended after the transmission of the payload key S in steps S9 and D4. However, the present disclosure also comprises embodiments in which a session is started when the recipient first enters his or her password or passphrase W in response to being prompted in step D2. As long as this session is active, the destination system 12 can request decryption of further payload keys S from the key server component 16, without any need for the recipient to enter his or her password or passphrase W again. In some embodiments, this functionality is implemented mainly at the side of the server system 10, in that the key repository 18 keeps the recipient's private key V unlocked during the entire time of the session. The destination system 12 can then request a further payload key S using a modified return message that contains an encrypted version of this further payload key S, but does not contain any password or passphrase W. In other embodiments, the presently discussed functionality is implemented mainly at the side of the destination system 12, in that the destination system 12 temporarily stores the password or passphrase W of the recipient and automatically inserts it into the return message RM each time a further payload key S is requested.

In all embodiments which use sessions, a single secured communication channel 24 may be held open and used throughout a session, or alternatively separate secured communication channels 24 may be established and closed for each pair of communications comprising a return message RM and a payload key S, or even for each single communication. The session may end when the recipient issues a log-out command, and/or after a certain time period of inaction, and/or after a certain maximum time period from establishment of the session.

The embodiment shown in FIG. 1 and FIG. 2 transfers the encrypted version of the payload key S from the server system 10 to the destination system 12 in the conveyance message CM, and then back to the server system 10 in the return message RM. Thus, neither the payload key S not its encrypted version needs to be stored in the server system 10. Given that the server system 10 may process a huge number of communications each day and would need to store all payload keys S for many years, this can be a considerable advantage. However, the present invention also comprises embodiments (not shown in the drawings) in which the server system 10 stores the respective payload key S associated with each payload data PD, either in plaintext or as an encrypted version, in persistent storage that is accessible to the server system 10. This persistent storage may be part of, or may be independent from, the key server component 16. In embodiments in which the server system 10 stores payload keys S (or encrypted versions thereof), the conveyance message CM and/or the return message RM do/does not need to contain a further copy of the encrypted version of the payload key S.

Embodiments in which one or both of the conveyance message CM and the return message RM are free from the encrypted version of the payload key S have reduced communication bandwidth requirements and may also reduce the storage requirements on the side of the destination system 12. However, the present invention further comprises embodiments (not shown in the drawings) in which the server system 10 stores payload keys S (or encrypted versions thereof) and in addition transmits the encrypted versions of the payload keys S to the destination system 12 in the conveyance messages CM. These embodiments have the advantage that they enable a compact return message RM as long as the server system 10 has access to the stored payload key S (or its encrypted version), while ensuring that the payload data PD remains accessible as long as the destination system 12 stores the encrypted version of the payload key S, even if, after some time, the server system 10 deletes the payload key S (or the encrypted version thereof) from its persistent storage.

The particulars contained in the above description of sample embodiments should not be construed as limitations of the scope of the invention, but rather as exemplifications of some embodiments thereof. Many variations are possible and are immediately apparent to persons skilled in the arts. In particular, this concerns variations that comprise a combination of features disclosed in the present specification. Accordingly, the scope of the invention should be determined not by the embodiments illustrated, but by the appended claims and their legal equivalents.

APPENDIX-LIST OF REFERENCE SIGNS 10 server system
12 destination system
14 mailing server component
16 key server component
18 key repository
20 key pair
22 (reference to) program module
24 secured communication channel
CM conveyance message
PD payload data
RM return message
S (symmetric) payload key
U public key
V private key
W password or passphrase
S1-S9 steps performed by the server system
D1-D6 steps performed by the destination system

What is claimed is:

1. A method for secure communication of payload data from a server system to a destination system used by a recipient, wherein the method comprises:
receiving, by the server system, the payload data to be communicated to the destination system;
determining, by the server system, a payload key;
encrypting, by the server system, the payload data by a symmetric encryption method using the payload key to obtain an encrypted version of the payload data;
encrypting, by the server system, the payload key by an asymmetric encryption method using a public key of the recipient to obtain an encrypted version of the payload key, wherein the recipient is associated with a key pair comprising the public key and a private key, and wherein the private key is protected by a password or passphrase of the recipient;
generating and sending, by the server system, a conveyance message to the destination system, the conveyance message comprising the encrypted version of the payload data;
receiving, by the server system, a return message from the destination system, the return message comprising the password or passphrase of the recipient;
accessing, by the server system, the private key of the recipient using the password or passphrase of the recipient;
decrypting, by the server system, the encrypted version of the payload key using the private key of the recipient, wherein the private key of the recipient does not leave a trusted environment of the server system; and
sending, by the server system, the payload key to the destination system via a secured communication channel to allow decryption of the encrypted version of the payload data using the payload key.

2. The method of claim 1, wherein the conveyance message further comprises the encrypted version of the payload key; and wherein the return message from the destination system further comprises the encrypted version of the payload key.

3. The method of claim 1, further comprising:
storing, by the server system, the encrypted version of the payload key in persistent storage accessible to the server system; and
prior to said decrypting, by the server system, the encrypted version of the payload key, accessing, by the server system, the encrypted version of the payload key from the persistent storage accessible to the server system.

4. The method of claim 1, wherein the server system comprises a mailing server component, a key server component, and a key repository.

5. The method of claim 1, wherein the server system does not have any access to the payload data, nor to the encrypted version of the payload data, during a time between sending the conveyance message and receiving the return message.

6. The method of claim 1, wherein the conveyance message is an email message that comprises at least one of (i) a markup language section, or (ii) an S/MIME container with at least the encrypted version of the payload data.

7. The method of claim 1, wherein the secured communication channel is at least one of (i) an SSL, or (ii) a TLS channel.

8. The method of claim 1, wherein the return message does not comprise the payload data nor the encrypted version of the payload data.

9. A method for secure communication of payload data from a server system to a destination system used by a recipient, wherein the method comprises:
receiving, by the destination system, a conveyance message from the server system, wherein the conveyance message comprises an encrypted version of the payload data, the encrypted version of the payload data having been encrypted by a symmetric encryption method using a payload key determined by the server system, wherein the recipient is associated with a key pair comprising a public key and a private key, wherein the private key is protected by a password or passphrase of the recipient, and wherein the payload key is encrypted by an asymmetric encryption method using the public key of the recipient to obtain an encrypted version of the payload key;
prompting, by the destination system, the recipient to enter the password or passphrase of the recipient, wherein the private key of the recipient does not leave a trusted environment of the server system;
generating and sending, by the destination system, a return message to the server system, the return message comprising the password or passphrase of the recipient to allow access to the private key of the recipient and decryption of the encrypted version of the payload key using the private key of the recipient to obtain a decrypted version of the payload key;

receiving, by the destination system, the decrypted version of the payload key from the server system via a secured communication channel; and decrypting, by the destination system, the encrypted version of the payload data by the symmetric encryption method using the decrypted version of the payload key received from the server system.

10. The method of claim 9, wherein the conveyance message further comprises an encrypted version of the payload key, the encrypted version of the payload key having been encrypted by an asymmetric encryption method using the public key of the recipient, and wherein the return message further comprises the encrypted version of the payload key.

11. The method of claim 9, wherein one or more of the steps of prompting the recipient, generating and sending the return message, and decrypting the encrypted version of the payload data is/are at least partially controlled by a program module.

12. The method of claim 11, wherein the conveyance message contains the program module.

13. The method of claim 11, wherein:
the conveyance message contains a reference to the program module;
the program module is stored at a server external to the destination system; and
the method further comprises the destination system downloading the program module from the external server.

14. The method of claim 11, wherein:
the conveyance message contains a first part of the program module and a reference to a second part of the program module;
the second part of the program module is stored at a server external to the destination system; and
the method further comprises the destination system downloading the second part program module from the external server.

15. The method of claim 11, wherein the program module is executed within at least one of (i) an Internet browser, or (ii) an email client application.

16. The method of claim 9, wherein the conveyance message is an email message that comprises at least one of (i) a markup language section, or (ii) an S/MIME container with at least the encrypted version of the payload data.

17. One or more non-transitory machine-readable media storing instructions for secure communication of payload data from a server system to a destination system used by a recipient, wherein the instructions, when executed by one or more processors, cause:
receiving, by the server system, the payload data to be communicated to the destination system;
determining, by the server system, a payload key;
encrypting, by the server system, the payload data by a symmetric encryption method using the payload key to obtain an encrypted version of the payload data;
encrypting, by the server system, the payload key by an asymmetric encryption method using a public key of the recipient to obtain an encrypted version of the payload key, wherein the recipient is associated with a key pair comprising the public key and a private key, and wherein the private key is protected by a password or passphrase of the recipient;

generating and sending, by the server system, a conveyance message to the destination system, the conveyance message comprising the encrypted version of the payload data;

receiving, by the server system, a return message from the destination system, the return message comprising the password or passphrase of the recipient;

accessing, by the server system, the private key of the recipient using the password or passphrase of the recipient;

decrypting, by the server system, the encrypted version of the payload key using the private key of the recipient, wherein the private key of the recipient does not leave a trusted environment of the server system; and sending, by the server system, the payload key to the destination system via a secured communication channel to allow decryption of the encrypted version of the payload data using the payload key.

18. The one or more non-transitory machine-readable media of claim 17, wherein the conveyance message further comprises the encrypted version of the payload key; and wherein the return message from the destination system further comprises the encrypted version of the payload key.

19. The one or more non-transitory machine-readable media of claim 17, wherein the instructions further comprise instructions that, when executed by one or more processors, cause:
storing, by the server system, the encrypted version of the payload key in persistent storage accessible to the server system; and
prior to said decrypting, by the server system, the encrypted version of the payload key, accessing, by the server system, the encrypted version of the payload key from the persistent storage accessible to the server system.

20. One or more non-transitory machine-readable media storing instructions for secure communication of payload data from a server system to a destination system used by a recipient, wherein the instructions, when executed by one or more processors, cause:
receiving, by the destination system, a conveyance message from the server system, wherein the conveyance message comprises an encrypted version of the payload data, the encrypted version of the payload data having been encrypted by a symmetric encryption method using a payload key determined by the server system, wherein the recipient is associated with a key pair comprising a public key and a private key, wherein the private key is protected by a password or passphrase of the recipient, and wherein the payload key is encrypted by an asymmetric encryption method using the public key of the recipient to obtain an encrypted version of the payload key;

prompting, by the destination system, the recipient to enter the password or passphrase of the recipient, wherein the private key of the recipient does not leave a trusted environment of the server system;

generating and sending, by the destination system, a return message to the server system, the return message comprising the password or passphrase of the recipient to allow access to the private key of the recipient and decryption of the encrypted version of the payload key using the private key of the recipient to obtain a decrypted version of the payload key;

receiving, by the destination system, the decrypted version of the payload key from the server system via a secured communication channel; and decrypting, by the destination system, the encrypted version of the payload data by the symmetric encryption method using the decrypted version of the payload key received from the server system.

21. The one or more non-transitory machine-readable media of claim 20, wherein the conveyance message further comprises an encrypted version of the payload key, the encrypted version of the payload key having been encrypted by an asymmetric encryption method using the public key of the recipient, and wherein the return message further comprises the encrypted version of the payload key.

* * * * *